United States Patent [19]

Gedig et al.

[11] 4,222,543
[45] Sep. 16, 1980

[54] VERTICAL AND ANGULAR ADJUSTMENT DEVICE FOR VEHICLE SEATS

[75] Inventors: Alfred Gedig; Burckhard Becker, both of Solingen, Fed. Rep. of Germany

[73] Assignee: Rob. Hammerstein GmbH, Solingen-Merscheid, Fed. Rep. of Germany

[21] Appl. No.: 956,879

[22] Filed: Nov. 1, 1978

[30] Foreign Application Priority Data

Nov. 7, 1977 [DE] Fed. Rep. of Germany ....... 2749716

[51] Int. Cl.² .............................................. B60N 1/02
[52] U.S. Cl. .................................. 248/394; 248/396; 248/421
[58] Field of Search ................ 248/396, 394, 395, 421

[56] References Cited

U.S. PATENT DOCUMENTS

| | | | |
|---|---|---|---|
| 2,609,029 | 9/1952 | Haberstump | 248/394 |
| 3,460,793 | 8/1969 | Posh | 248/396 |
| 3,662,984 | 5/1972 | Robinson et al. | 248/394 |
| 3,669,398 | 6/1972 | Robinson | 248/394 |
| 3,692,271 | 9/1972 | Homier et al. | 248/396 |

FOREIGN PATENT DOCUMENTS 2659308 12/1976 Fed. Rep. of Germany ........... 248/421

Primary Examiner—Francis K. Zugel
Attorney, Agent, or Firm—Michael J. Striker

[57] ABSTRACT

The vertical and angular position adjusting device for motor vehicle seats includes a pair of base frames and a pair of seat carriers, each base frame and each set carrier being linked by a support arm and by an elbow joint to form a five-bar linkage, the lower lever of the elbow joint and the support arm being provided respectively with a gear segment and the base frame portion between the two gear segments pivotably supporting a two-arm control member having each arm terminated with locking teeth cooperating with the corresponding gear segment to lock the latter in an adjusted angular position. The control member is spring-biased and guided in an oblong slot so that it is controllable by a handle out and into engagement with the gear segments.

8 Claims, 8 Drawing Figures

VERTICAL AND ANGULAR ADJUSTMENT DEVICE FOR VEHICLE SEATS

BACKGROUND OF THE INVENTION

The invention relates to a device for vertical and angular position adjustment of vehicle seats, and more particularly it relates to an adjustment device of the type in which a seat carrier and a bottom frame fixed to the floor of the vehicle are linked by adjustable members to form together a five-bar linkage, the adjustable members including at least one support or link between one end portion of the seat carrier and the bottom frame and at least one elbow joint between the other end portion of the seat carrier and the bottom frame; the lower lever of the elbow joint and the support lever are provided respectively with a gear segment which is in mesh with locking pawls controlled by means of a pivotably supported hand lever.

A vehicle seat adjuster of the above type is known, for example from the German published application No. 2,206,884. The gear segment on the adjustment members linking the base frame are internal gear segments cooperating respectively with arresting gears. The counteracting arresting gear assigned to the supporting arm is made in the form of an externally geared sliding member arranged on a radially shiftable cam supported on the first bearing element; the contacting arresting gear assigned to the elbow lever joint is provided also with external gears and is made in the form of a rocking lever controlled by a cam arranged on a second bearing element. Both cams are linked to connecting rods which are connected to each other by means of a tension spring and have at their free ends slots for engagement with a lever that is pivotably supported in the base frame and carries a control grip.

These conventional vertical and angular position adjusting devices for vehicle seats are assembled of a relatively large number of component parts so that production and assembly costs are relatively high and in addition such complicated structures have the disadvantage that they are prone to rattle and are susceptible to failures.

SUMMARY OF THE INVENTION

It is, therefore, a general object of the present invention to overcome the aforementioned disadvantages.

More particularly, it is an object of the invention to provide an improved vertical and angular position adjuster for vehicles which is assembled of a relatively small number of component parts which are simple to manufacture and results in low manufacturing and assembling costs.

An additional object of the invention is to provide such an improved adjustment mechanism which is simple to operate.

A further object of the invention is to provide such an improved adjustment mechanism which has a relatively flat structure so that it can be with advantage combined with conventional sliding tracks for longitudinal adjustment of the seat.

In keeping with these objects, and others which will become apparent hereafter, one feature of the invention resides, in a vertical and angular position adjustment mechanism for motor vehicle seats including a base frame fixed to the floor of the vehicle and a seat carrier fixed to the seat, in a combination comprising linking means hinged between the frame and the carrier to form a five-bar linkage therewith, at least one bar of the linkage being an elbow joint, a spring-biased control member pivotably connected to the frame and adapted for movement between at least a control position and a locking position, and a locking gear mechanism including gear segments provided respectively on the elbow joint and the other bar of the five-bar linkage, first locking teeth fixed to the control member and engageable with the gear segment on the elbow joint, second locking teeth coupled to and controlled by the control member and engageable with the gear segment on the other bar of the linkage, whereby the release and engagement of respective locking teeth is dependent on the angular position of the locking member in its control position.

The adjustment device of this invention has the advantage that apart from the elbow joint and the supporting arm for the seat carrier, it contains only one movable control member which controls the locking of the seat in its adjusted position. The control member is pivotably mounted in the frame of the seat and in addition is adapted for linear displacement in an oblong slot for instance. The control member is spring-biased in such a manner that during its rest or locking position its pivot pin is located between the ends of the oblong slot. If the control member in the preferred embodiment is terminated with two transverse arms or projections, one having locking teeth engaging the gear segment fixed to the elbow joint and the other projection cooperating with a pivotable arresting lever also having locking teeth so that in the rest position of the control member the first-mentioned projection arrests the elbow joint and the other projection abuts against the pivotable arresting lever and forces the locking teeth of the latter into engagement with the locking gear segment on the seat supporting arm. In this manner, in one end position of the control member the engagement of the locking teeth with opposite locking gears leads to angular displacement of the arresting lever into its locking position with the other locking gear.

The control member is operated by a handle and due to its linear guiding it has no definite pivot axis but is turned in accordance with the position of the handle either in the front part or in the rear part of the guiding slot. The linear movement of the control member makes it possible to disengage locking teeth from both locking gears. This linear displacement is greater than the depth of meshing of the locking teeth and the biasing spring urges the control member counter to the disengaging direction and prevents the pivot axle or pin of the control member from free movement between the ends of the oblong slot. The diameter of the pivot axle or pin of the control member corresponds substantially to the width of the oblong guiding slot to prevent lateral movement of the control member and stabilize the locking position of the gears.

The vertical and angular position adjusting mechanism of this invention can be constructed very flat when viewed from a lateral side of the seat and also its height can be made very small. The vertical position or the inclination of the seat can be adjusted alternately by a single hand-operated lever.

The guiding of the pivot pin of the control member in the oblong slot has, furthermore, the advantage that the assembly of the adjustment device is simplified and also the biasing spring for the control member can be with preference made in the form of a two-arm bent spring having a loop which can be simply slipped on the pivot pin.

In a kinematic reversal it is also possible to fix the pivot pin on the base frame of the seat and the oblong guiding slot is made in the control member. The guiding slot can be made open at one narrow end thereof and only the end in the direction of disengagement of the locking gears is closed and serves as a stop for the pivot axle of the control member. This stop prevents the control member from being pushed counter to the biasing spring for an excessive distance.

The biasing spring and the longitudinal guiding means for the control member can be combined whereby suitable stops for limiting the longitudinal displacement of the control member are necessary. Preferably an arm of the bent biasing spring can serve as the pivot axle or pivot pin for the control member. In this case, the oblong slot can be dispensed with.

The base frame of the seat is normally made of two pairs of sliding rails or tracks for adjusting the position of the seat in longitudinal direction. The adjustment device for controlling the angular and vertical position of the seat according to this invention can be arranged on base frame parts on both sides of the seat. In this case, a control lever is arranged at each side of the base frame and both control levers are rigidly connected one to another by connecting rods so that both vertical and angular adjustment devices work simultaneously.

Moreover, it is also possible to connect the pivot axles of the seat supporting arms and of the lower arms of the elbow joint on both sides of the seat by transverse rods so that it is sufficient to provide a single control lever with its control member and cooperating locking gears at one of the two base frames of the seat. The transverse rods transmit the pivotal movement of respective links of one five-bar linkage to the opposite five-bar linkage without the necessity to provide arresting gears in the latter.

In a preferred embodiment, the arresting gears are made in the form of gear segments fixed to the supporting arm for the seat carrier and to the pivotable lower lever of the elbow joint, respectively.

With advantage, the gear segments are external gears shaped directly in a marginal portion both of the lower lever of the elbow joint and in a marginal section of the supporting arm so that both parts can be made by stamping from a flat piece of metal, for example. The counteracting arresting members have preferably only one or two teeth. This reduction in the number of arresting teeth makes the locking action more reliable and in addition enables a reduction in size of the locking members.

The novel features which are considered as characteristic for the invention are set forth in particular in the appended claims. The invention itself, however, both as to its construction and its method of operation, together with additional objects and advantages thereof, will be best understood from the following description or specific embodiments when read in connection with the accompanying drawings.

DESCRIPTION OF THE PREFERRED EMBODIMENTS

Figure 1:
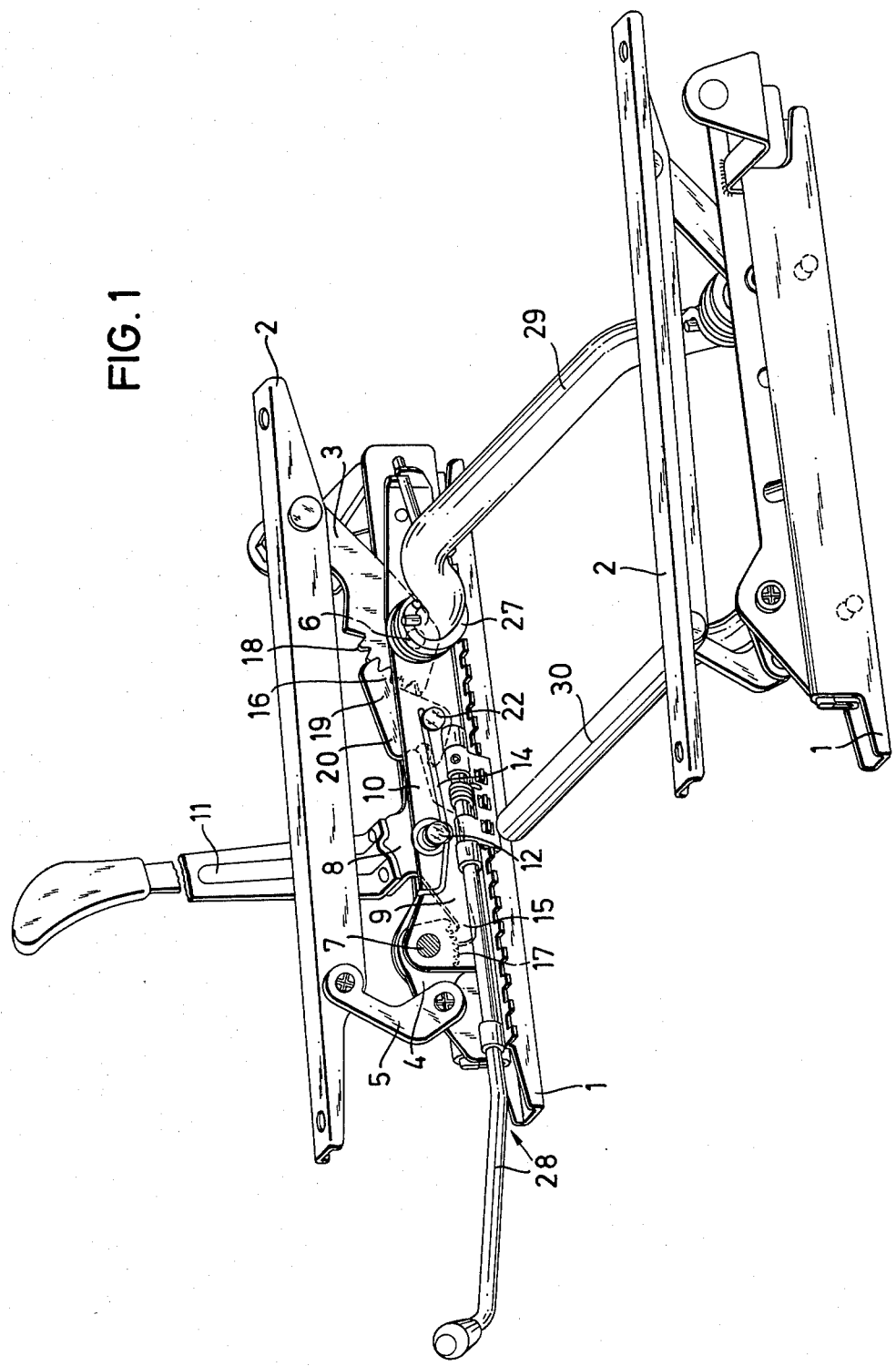
FIG. 1 is a perspective view of one embodiment of the vertical and angular position adjustment device for vehicle seats of this invention.

The device for adjusting the vertical and angular position of a vehicle seat as illustrated in FIG. 1 is assembled essentially of stationary base frames 1 fixed to the floor of the vehicle and of seat carriers 2 fixed to the vehicle seat. Each base frame 1 includes a pair of sliding rails or tracks extending along a lateral side of the seat. Each base frame 1 is linked to a corresponding seat carrier 2 by means of a support arm 3 arranged at front end position of frame 1 and carrier 2 whereas the rear end portions of these parts are linked by means of an elbow joint consisting of a lower lever 4 hinged to frame 1 and a bent upper lever 5 hinged between the free end of lower lever 4 and seat carrier 2. Support arm 3 and lower lever 4 of the elbow joint are pivotably connected to base frame 1 by pivot axles 6 and 7, respectively. In this manner, base frame 1, seat carrier 2, support arm 3 and elbow joint 4 and 5 form together a five-bar linkage at each side of the seat. Pivot axles 6 and 7 at one side are connected for rotation with corresponding axles in the five-bar linkage at the other side of the seat by means of transverse bars 29 and 30 so that relative angular displacement of links in one linkage is synchronously transferred to corresponding links in the other linkage.

In this embodiment a control member forming a second latch 8 is pivotably mounted on base frame 1 between support arm 3 and elbow joints 4 and 5. The latch 8 is connected to an upwardly projecting handle 11 located laterally to the seat so that the user of the seat can conveniently adjust the latter.

Lower end of the second latch 8 supports two transverse projections or arms 9 and 10 extending substantially in the direction of the base frame. The free end of arm 9 is provided with upwardly directed locking teeth 15 engageable with gear segment 17 provided on the lower part of lower lever 4. Both levers 4 and 5 of the elbow joint are made preferably of flat pieces and the lower lever is shaped together with gear segment 17 by stamping.

The other arm 10 of control member 8 terminates with cam 23 cooperating with a recessed face 33 in one arm 20 of a two-arm lever 21 forming a front latch. The other arm 19 of the first latch 21 has at its free end two locking teeth 16 which are engageable with gear segment 18 formed integrally with the lower end of supporting arm 3. Accordingly, while locking of the elbow joint 4 and 5 in its adjusted position is affected by locking teeth 15 directly connected to member 8 and handle 11, support arm 6 is arrested on its adjusted position by teeth 16 on an intermediate member, namely on the transmission lever 21 which is actuated by the other arm 10 of the second latch 8.

Pivot shaft or pin 12 of control member 8 is supported for linear displacement in an oblong guiding hole or slot 13 in base frame 1. Oblong slot 13 extends in the direction of engagement of locking teeth, in this case in a substantially vertical direction. Pressure spring 14 urges pin 12 and thus the whole latch 8 upwardly into the range of the upper end of slot 13. The mutual position between arms 9 and 10 of the second latch 8 and levers 4 and 29 is adjusted such that the engaging locking gears and teeth prevent pivot pin 12 from abutting against the upper end of slot 13. In this manner the biasing force of spring 14 keeps the locking teeth 15 firmly in mesh with gear segment 17 and at the same time it urges via cam 23, that presses against contact face 25 of recess 33 in the first latch 21, to engage with its locking teeth 16 the corresponding gear segment 18 in support lever 3. By virtue of the intermediate coupling piece in the locking gear, namely of the first latch 21, an almost complete reversal of the arresting movement is attained at one side of the second latch 8 and the direction of engagement of locking teeth 16 with gear segment 18 is inclined downwardly and forwardly in comparison to vertical direction of movement of locking teeth 15 on the other transverse arm of the second latch. The length of slit 13 is substantially increased in upward direction in order to prevent upper end of the slot from stopping pivot pin 12 which might interfere with the locking of gears 15 and 17. An upwardly open elongated slot 13 has the advantage that also the assembly of the device is simplified. The guiding range of hole or slot 13 in downward direction has to be made sufficient for permitting the displacement of handle 11 as low as to insure complete disengagement of locking teeth 15 from the opposite locking gear 17. When handle 11 is turned rearwardly, that means to the right in the drawing, the other arm 10 of latch 8 causes the disengagement of locking teeth 16 from gear segment 18 on support arm 3. The condition for releasing lower lever 4 of the elbow joint can be derived as follows: The length of travel of the second latch 8 in oblong slot 8 has to be at least equal to the height of teeth of locking gears 15 and 17, that means this height must correspond at least to the distance of pivot pin 12 to the lower end of the oblong slot. This minimum length of travel permits locking teeth 15 to release lower lever 4 of the elbow joint so that the latter lever can be freely pivoted.

Pivot pin 12 can be made also in the form of a slightly bulged square pin so that it is guided in hole 13 along two contact surfaces.

In the embodiment as shown in FIG. 1, the second latch 8, arresting means 15, 17 and 16, 18 are provided on base frame 1 at one side of the vehicle seat only and the tilting movement of support arm 3 and of lower lever 4 of elbow joint is transmitted to corresponding counter parts of the five-bar linkage on the opposite side of the seat by means of rigidly connected rods 29 and 30. With advantage at least the rear connecting rod 29 is equipped with torsional springs. It is of course also possible to equip both base frames 1 with identical controlling members 8 and 8' cooperating with corresponding locking gears 15, 16, 17 and 18. In this case, pivot pins of respective control members can be rigidly connected one to another, and the rigid connection of pivotable levers 3 and 3', 4 and 4' becomes redundant. Accordingly, connecting rods 29 and 30 can be either dispensed with or made in the form of torsional springs.

Spring 14 as illustrated in FIG. 1 is made in the form of a bent spring having a central loop and two opposite arms forming an angle of approximately 180° with one another. The central loop of the spring is slipped on pin 12 whereby one of its arms rests upon axle journal 22 of the first latch 21 and the other arm is shaped so as to abut against the upper edge of base frame 1.

As it has been mentioned previously, rear connecting rod 29 is spring-biased by spiral spring 27 which at one end rests on base frame 1 and biases support arms 3 upwardly so that the adjustment of the position of an occupied seat is made more convenient. Central portions of connecting rods 29 and 30 are offset relative to their axis of rotation so that the clearance of the seat with respect to the floor of the vehicle is increased.

As it has been also mentioned above, each base frame 1 consists of two pairs of sliding rails, whereby the mutual position of the rails in each pair can be arrested by means of arresting device 28 which determines the longitudinal position of the seat. In the five-bar linkage which determines the vertical and angular position of the seat the elbow joint which includes the lower and upper levers 4 and 5 can be made either in front of pivot axle 7 or between the pivot axle 7 and pivot pin 12.

Figure 2:
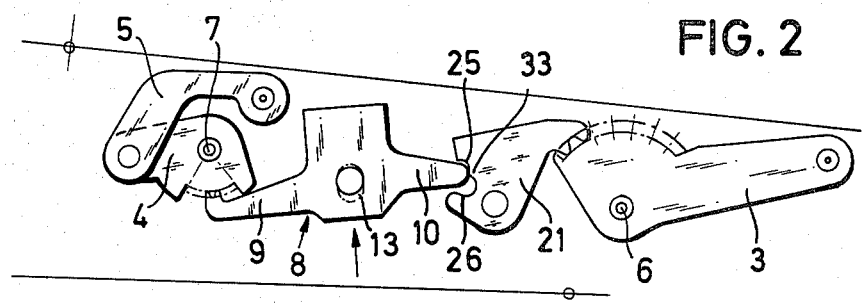
FIGS. 2-5 show schematically different adjustment positions of the control member and locking gears in the adjustment device of this invention.
Figure 3:
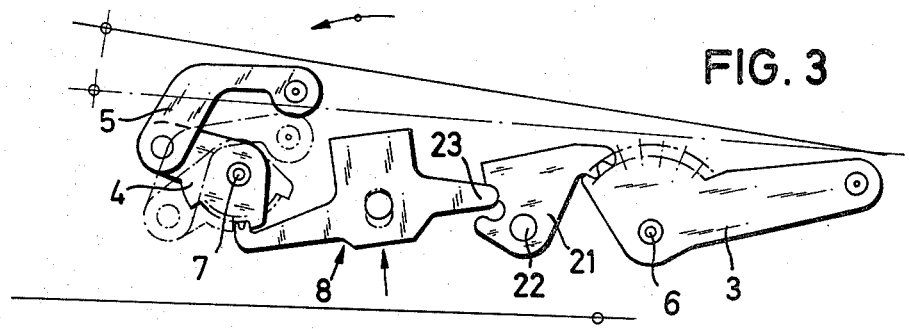
Figure 4:
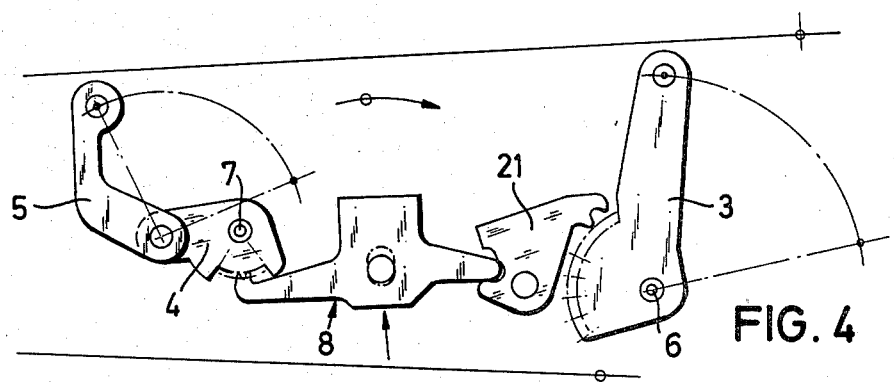
Figure 5:
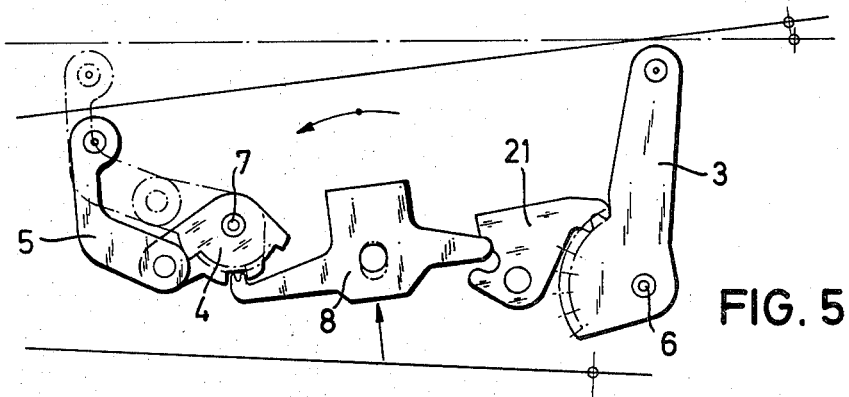
Figure 6:
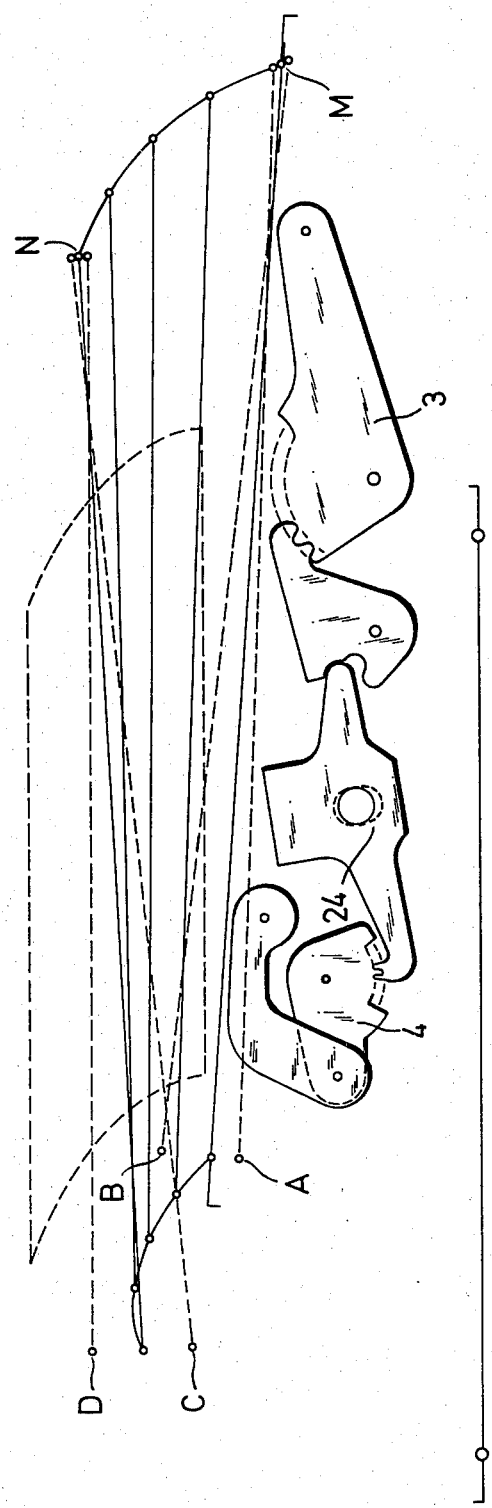
FIG. 6 shows schematically the adjustment range of the vertical and angular position adjustment mechanism of this invention.

The operation of vertical and angular position adjusting device of this invention is further illustrated in FIGS. 2-5. In comparison with the adjusted position shown in FIG. 1, the vertical position of the seat as shown in FIGS. 2 and 3 is lower and the seat surface is more inclined rearwardly by adjusting the angular position of lower lever 4 such that locking teeth of projection 9 of the second latch 8 engage the gear segment of lever 4 in the range of the right-hand stop surface whereas teeth 16 of the first latch 21 engage teeth 18 in the range of the left-hand stop of the gear segment of support lever 3. In this manner the front edge of the vehicle seat is rotated on a circular path, the center of rotation of which is located at the rear of the seat carrier 2. The elevation of the seat is effected by rotating the support arm 3 and upper lever 5 of the elbow joint counterclockwise. The rearwardly inclined position of the seat can be changed by displacing the point of engagement of locking teeth 15 towards the front stop of gear segment 17, as illustrated in FIGS. 4 and 5. Also by selecting a suitable point of engagement of locking teeth 16 with gear segment 18, the seat can be angularly offset to incline forwardly or to be substantially parallel with the floor. The entire range of adjustment of the seat by means of the device according to this invention is illustrated in FIG. 6. If support arm 3 is arrested in its swung open position as shown in the Figure, so by pivoting the lower lever 4 between the limit stops of its gear segment the front edge of the seat can be adjusted between the points A and B. The rear edge of the seat during this angular adjustment remains substantially stationary or very slightly displaced about a center point M. If support lever 3 is pivoted forwardly into its upright limit position the rear edge of the seat is displaced from the point M into the point N. From point M the angular position of the seat can again be adjusted between the points C and D by arresting gear segment 17 of lower lever 4 in one of a plurality of positions between its front stop and its rear stop.

Figure 7:
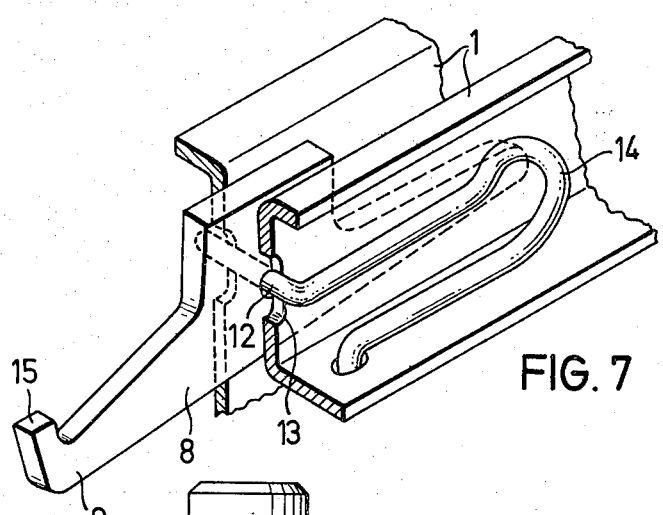
FIG. 7 is a perspective and partly sectional view of a portion of the control member in a modification of the device of this invention.

FIG. 7 shows a modification of the spring-biased support for the second latch 8 on base plate 1. In this embodiment, biasing spring 14 is in the form of a U-shaped spring having one arm bent at right angle and anchored in frame 1. The other arm is also bent at right angle perpendicularly to the bent end portion of the other arm and is directed through the vertical longitudinal slot 13 and supports for pivotal movement latch 8 so that this end portion of spring 14 acts as pivot pin 12. The length and the size of slot 13 is dimensioned such as to insure sufficient displacement of a single locking tooth 15 from the opposite gear segment. The width of slot 13 corresponds substantially to the diameter of the end portion 12 of the biasing spring 14 so that second latch 8 is displaceable in a single vertical direction only.

In a still further modification of the embodiment of FIG. 7, guiding slot 13 can be dispensed with provided that spring 14 is fixed to base frame 1 in at least two points.

Figure 8:
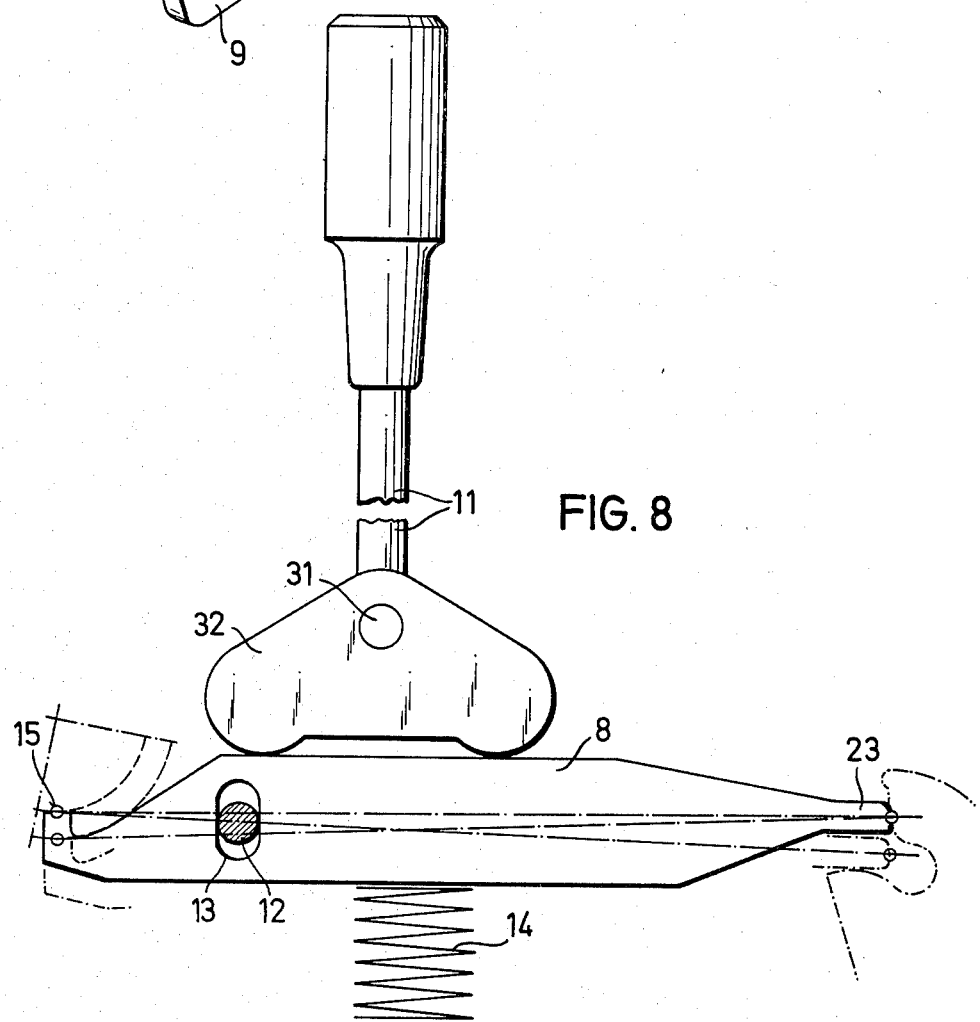
FIG. 8 is a side view of another modification of the control member in the device according to this invention.

Referring now to FIG. 8, there is shown still another variation of the embodiment of control member in the device of this invention. Handle 11 in this embodiment is pivotable about a stationary axle 31 and is rigidly connected with a two-arm cam 32 which abuts with both of its arms on the upper surface of the spring-biased second latch 8. Biasing spring 14 in this embodiment is in the form of a spiral spring acting against the lower surface of the control member. Guiding slot 13 is now provided in control member 8 and cooperates with a stationary guiding pin 12. In this manner, it is possible to situate oblong guiding slot at any point off the center of the latch 8; this arrangement may be necessary when the height of locking teeth in one gear segment differs from that in the other gear segment and the path of movement of arresting teeth has to be adjusted accordingly. In this manner it is also possible to regulate transmission forces necessary for disengaging one or the other arm 9 and 10 of the second latch 8.

It will be understood that each of the elements described above, or two or more together, may also find a useful application in other types of constructions differing from the types described above.

While the invention has been illustrated and described as embodied in a vertical and angular position adjusting device for use with vehicle seats, it is not intended to be limited to the details shown since various modifications and structural changes may be made without departing in any way from the spirit of the present invention.

What is claimed as new and desired to be protected by Letters Patent is set forth in the appended claims.

1. A vertical and angular position adjusting device for use in vehicle seats, comprising:
a base frame connected to the floor of the vehicle; a seat carrier connected to the seat; linking means including a two-bar elbow joint hinged between first juxtaposed ends of said frame and said carrier and one bar hinged between second ends of said frame and said carrier to form therewith a five bar linkage; a first gear segment secured to said one bar; a first latch supported for tilting movement in the plane of said first gear segment and having at least one tooth engageable with the latter and a recessed face defining two switching portions; a second gear segment secured to a bar of said elbow joint; a second latch in the form of a two-arm lever supported for a combined tilting and linear movement in the plane of said second gear segment and having on one arm thereof provided with a locking tooth engageable with said second gear segment and the other arm thereof provided with a projecting cam engageable with one switching portion of said first latch corresponding to a locking position of said first latch with said first gear segment, and, alternately with the other switching portion corresponding to the releasing position of said first latch; means for guiding said second latch in a linear direction between a locking position in which said locking tooth is in engagement with said second gear segment and a releasing position away from said second gear segment; spring means normally biasing said second latch into said locking position; a hand-operated lever coupled to said second latch to rotate the same between a first end position in which said cam engages said one switching face portion and an opposite second end position in which said cam engages said other switching face portion and to displace said second latch in said guiding means against said biasing spring.

2. A device as defined in claim 1 wherein one bar of said elbow joint, said first latch and said second latch are supported, respectively on said frame and said second gear segment is secured to said one bar of said elbow joint.

3. A device as defined in claim 2 wherein said guiding means includes a vertically directed slot in said frame and a pin projecting from said second latch into said slot.

4. A device as defined in claim 2 wherein said guiding means includes a slot provided in said second latch in the direction of engagement of said locking tooth with said second gear segment and a lateral pin projecting from said frame into said slot.

5. A device as defined in claim 2 wherein said hand-operated lever is rigidly connected to said second latch.

6. A device as defined in claim 4 wherein the upper part of said slot is open.

7. A device as defined in claim 3 wherein said biasing spring is a two arm torsion spring supported on said pin and having one arm engaging said frame and the other arm biasing said second gear segment into engagement with said locking tooth of said second latch.

8. A device as defined in claim 2, including a handle pivotable about an axle on said frame part, said handle being terminated with a two-arm cam engaging the top surface of said second latch.

* * * * *